(12) United States Patent
Macias Cubeiro et al.

(10) Patent No.: US 10,837,529 B2
(45) Date of Patent: Nov. 17, 2020

(54) ELECTRICAL TELESCOPIC STRUT CONSTRUCTION

(71) Applicant: CESA, C. Espanola de Sistemas Aeronauticos, S.A., Getafe (ES)

(72) Inventors: Rosa Macias Cubeiro, Getafe (ES); Jose Luis Crespo Chico, Getafe (ES); Esteban Morante Lopez, Getafe (ES); Francisco Jose Aguado Lopez, Getafe (ES)

(73) Assignee: CESA, COMPANIA ESPANOLA DE SISTEMAS AERONAUTICOS, S.A., Getafe (ES)

( * ) Notice: Subject to any disclaimer, the term of this patent is extended or adjusted under 35 U.S.C. 154(b) by 94 days.

(21) Appl. No.: 16/162,089

(22) Filed: Oct. 16, 2018

(65) Prior Publication Data

US 2019/0113115 A1    Apr. 18, 2019

(30) Foreign Application Priority Data

Oct. 17, 2017    (EP) .................................... 17382688

(51) Int. Cl.
*F16H 25/20* (2006.01)
*B66F 3/10* (2006.01)
*B66F 3/28* (2006.01)

(52) U.S. Cl.
CPC ............... *F16H 25/20* (2013.01); *B66F 3/10* (2013.01); *B66F 3/28* (2013.01)

(58) Field of Classification Search
CPC ............... F16H 25/20; B66F 3/10; B66F 3/28
See application file for complete search history.

(56) References Cited

U.S. PATENT DOCUMENTS

| | | | |
|---|---|---|---|
| 2,476,376 A | 7/1949 | Laraque | |
| 4,790,201 A * | 12/1988 | Gheddo | B62D 33/067 74/89.37 |
| 6,832,540 B2 * | 12/2004 | Hart | F15B 15/2807 92/24 |
| 8,499,654 B2 * | 8/2013 | Ymker | F16H 25/20 74/89.23 |

(Continued)

OTHER PUBLICATIONS

Search Report issued by the European Patent Office dated Jan. 16, 2018.

*Primary Examiner* — Bobby Rushing, Jr.
(74) *Attorney, Agent, or Firm* — Squire Patton Boggs (US) LLP (57) ABSTRACT

Electrical telescopic strut construction, movable between an extended locked position and a retracted unlocked position, comprising:
an external cylinder (1);
an inner cylinder (2);
a screw (3) rotatable disposed within the inner cylinder (2);
a drive (4) configured to rotate the screw (3);
a nut (5) being movable with respect to the external cylinder (1) responsive to the rotation of the screw (3);
at least one segment (6) located in a radial opening of the inner cylinder (2) and movable radially outward and inward in response to the movement of the nut (5) and configured to engage the external cylinder (1) when moved radially outward and not to engage the external cylinder (1) when moved radially inward,
a second inner cylinder (7) located external to the first inner cylinder (2) and internal to the external cylinder (1).

10 Claims, 12 Drawing Sheets

(56) References Cited

U.S. PATENT DOCUMENTS

| | | | |
|---|---|---|---|
| 8,505,399 B2* | 8/2013 | Hirai | F16H 25/2454 33/37 |
| 2016/0025199 A1 | 1/2016 | Boone et al. | |
| 2016/0195115 A1 | 7/2016 | Fenn et al. | |
| 2017/0143909 A1* | 5/2017 | Larsen | F16H 25/20 |

* cited by examiner

ELECTRICAL TELESCOPIC STRUT CONSTRUCTION

FIELD OF THE INVENTION

The present invention refers to an electrical telescopic strut construction for locking/unlocking aircraft cowls under load. The strut is movable between an extended, locked position and a retracted, unlocked position.

The project leading to this application has received funding from the European Union's Horizon 2020 research and innovation programme under grant agreement No 636218.

BACKGROUND OF THE INVENTION

As aircraft cowlings tend to be hefty, especially those covering large aircraft engines, and their weight can amount to hundreds of kilograms, an inadvertent unlocking of the collapsible strut construction in its extended, locked position results in a rapid, unpredictable closure of the aircraft cowling that may result in serious injury or even death of an operator performing maintenance operations of the engine beneath the aircraft cowling. Different solutions aimed at preventing an inadvertent unlocking of the collapsible strut construction in its extended, locked position.

A plurality of collapsible strut constructions have been employed over past years for supporting aircraft cowlings in an open position as, for example, during maintenance operations of the engines. Linear collapsible mechanical struts are also employed in various environments and applications for moving one mechanical part relative to another mechanical part.

The struts may be powered by a hydraulic motor drive or by an electric motor drive. One example application is for aircraft wherein actuators may be employed to deploy and retract various assemblies, e.g., a landing gear, a cargo door, a foldable part such as part of a wing, blade or tall, and other similar parts. Said actuators must withstand substantial loads and the drive mechanism must be made substantially stronger so that it can bear the applied loads. As a result the actuator and its drive mechanism can be quite heavy.

One of the disadvantages of known systems is that, due to the high load the strut must withstand, the elements are damaged resulting in a malfunctioning or an inadvertent unlocking of the system.

Additionally, known struts are not fall safe against the damage of one of its components. To solve this two independent actuators are typically used. Some double load paths struts are also used, usually having two screws, a conventional screw and an inverted screw. The disadvantages of said systems are that it increases the weight of the strut and that the interaction of both screws may cause functioning problems.

SUMMARY OF THE INVENTION

One of the objects of the present invention is to provide a telescopic locking strut which is capable to lock and release, for instance, heavy aircraft cowls without need of manual operation.

It is object of the present invention an electrical telescopic strut constructions movable between an extended, locked position and a retracted, unlocked position, comprising:
an external cylinder having a connection end configured for being connected to the structure of the aircraft;
an inner cylinder slidable within the external cylinder and having a second connection end configured for being connected to a movable structure, for instance, a door;
a screw rotatable disposed within the inner cylinder;
a drive attached to the external cylinder and configured to rotate the screw;
a nut coupled to the screw and connected to the inner cylinder, said nut being slidable movable with respect to the external cylinder;
at least one segment located in a radial opening of the inner cylinder and movable radially outward and inward in response to the movement of the nut and configured to engage the external cylinder when moved radially outward and not to engage the external cylinder when moved radially inward, the inner cylinder being lockable to the external cylinder by the segment in an extended position of the strut, and
a second inner cylinder located external to the first inner cylinder and internal to the external cylinder when the first inner cylinder is retracted into the external cylinder, the second internal cylinder being joined to the first inner cylinder such that both are displaced together.

The invention permits to an electromechanical actuator based on a linear screw the accomplishment of the following additional advantages:

Extend and retract the telescoping strut under load to their maximum positions.

Lock and release automatically without manual operation while the strut under load is operated by an electromechanical mechanism to avoid accidental release.

Automatically mechanical lock in extended position.

Assuring a redundant load path.

As previously stated, one object of the present invention is to prevent the inadvertent unlocking of the strut thanks to the locking mechanism. This mechanism is based on segments and openings designed for avoiding the unlocking of the strut with the external load. For unlocking the strut, it is necessary to activate the electromechanical system to allow the release the strut.

Still another object is its automatically lock in extended position and which can only be unlocked by the activation of the electromechanical system. Without any manual operation to unlock neither to remove the load from actuator.

The above objects are accomplished with a feature that operates the strut to extend and retract under load. For extending/retracting the strut, the same electromechanical actuator is used to pull the weight of the cowl and the wind forces by pulling the inner rod out of the strut with a linear screw.

Therefore, the strut according to the invention comprises: an external cylinder, an internal cylinder movable in the external cylinder in an extending direction and in a retracting direction; an additional internal cylinder, an elongated screw in the bore of the external and the internal cylinders and rotatable by a motor drive; a nut coupled to the inner cylinder and movable in the bore of the external cylinder in the extending direction and in the retracting direction responsive to rotation of the elongated screw; at least a lock segment in the internal cylinder and movable radially outward and radially inward in response to movement of the nut. The lock segment engages the external cylinder when moved radially outward, whereby the internal cylinder is lockable to the external cylinder by the lock segment.

The system comprises a double load path, based on a double internal cylinder and the segments. Therefore, the inner cylinder is part of the first load path and the second inner cylinder is part of the second load path. Thus, the system is designed with a safety requirement categorized as catastrophic, the first level of safety. There can be no single failure that results in fully extended actuator retraction.

The system additionally may comprise double connection ends to the aircraft structure and to the cowls.

DESCRIPTION OF THE DRAWINGS

FIG. 12B shows an enlarged view of FIG. 12.

FIG. 13B shows an enlarged view of FIG. 13.

FIG. 14B shows an enlarged view of FIG. 14.

FIG. 15B shows an enlarged view of FIG. 15.

FIG. 16B shows an enlarged view of FIG. 16.

DETAILED DESCRIPTION OF THE INVENTION

An embodiment of the present invention for a strut construction, movable under load from an extended, locked position to a retracted, unlocked position will be described hereinafter.

Figure 1:
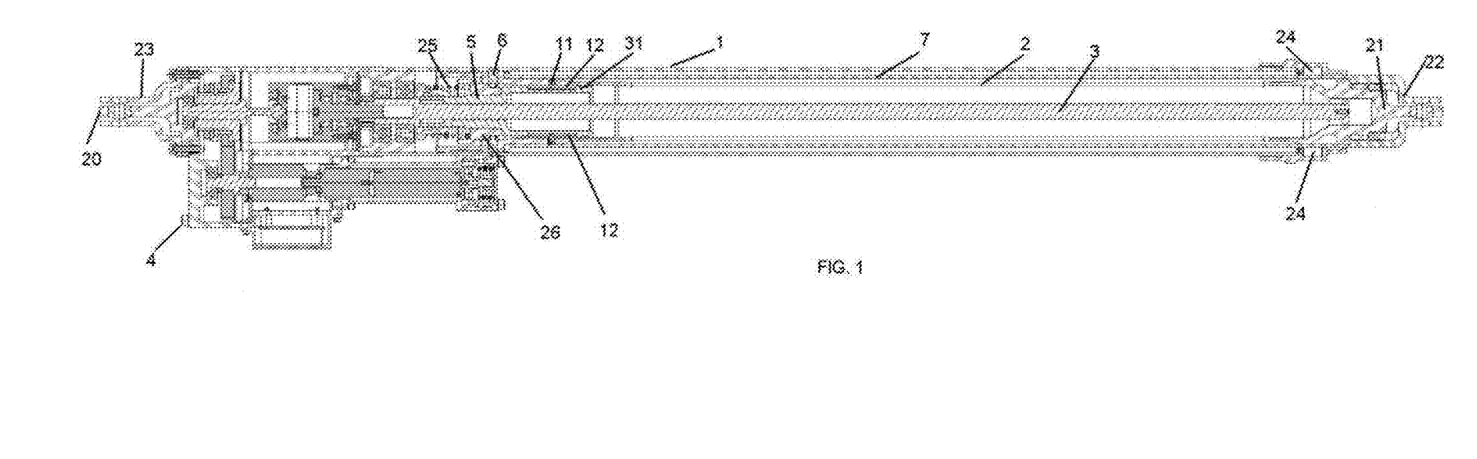
FIG. 1 shows a sectional longitudinal plan view of the strut construction in a retracted, unlocked position according to a preferred embodiment of the invention.
Figure 2:
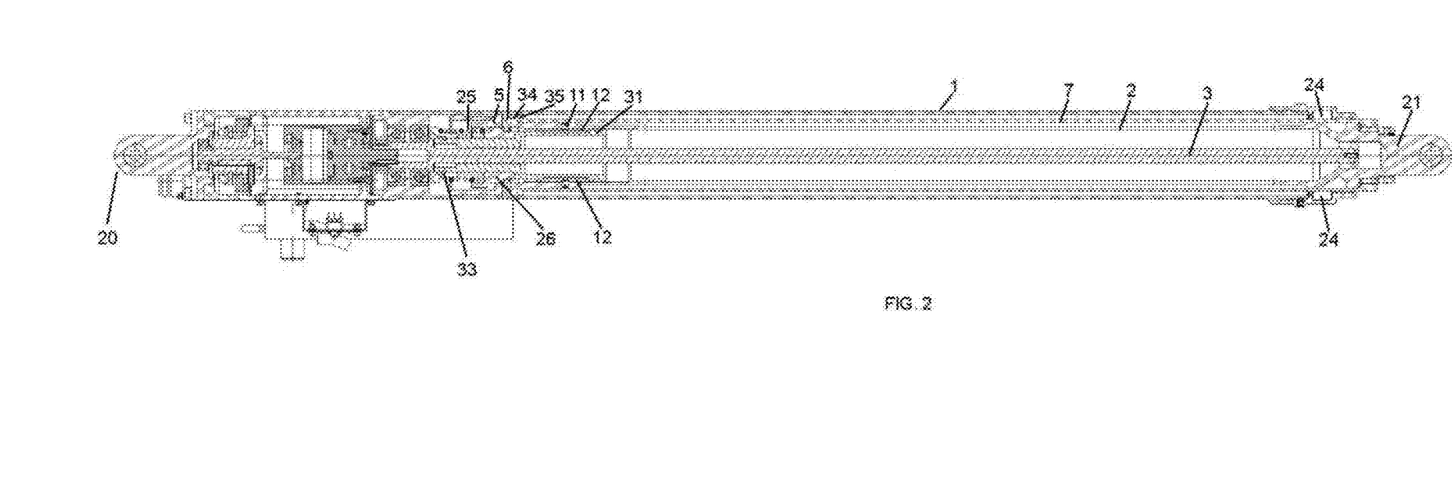
FIG. 2 shows a sectional longitudinal lateral view of the strut construction of FIG. 2.

FIG. 1 shows an embodiment of the collapsible strut construction in the retracted, unlocked position that comprises:

an external cylinder (1) having a lug (20) at an end;
an inner cylinder (2) slidable within the external cylinder (1) and having a second lug (21) at an end;
a screw (3) rotatable disposed within the inner cylinder (2);
a drive (4) attached to the external cylinder (1) and configured to rotate the screw (3);
a nut (5) coupled to the screw (3) and connected to the inner cylinder (2), being movable with respect to the external cylinder (1) responsive to the rotation of the screw (3);
at least one segment (6) located in a radial opening of the inner cylinder (2) and movable radially outward and inward in response to the movement of the nut (5) and configured to engage the external cylinder (1) when moved radially outward and not to engage the external cylinder (1) when moved radially inward, the inner cylinder (2) being lockable to the external cylinder (1) by the segment (6) in an extended position of the strut,
the strut further comprises a second inner cylinder (7) located external to the first inner cylinder (2) and internal to the external cylinder (1) when the first inner cylinder (2) is retracted into the external cylinder (1), the second inner cylinder (7) being joined to the first inner cylinder (2) such that both cylinders (2, 7) are displaceable together.

Therefore, both the first (2) and the second (7) inner cylinder are disposed in the external cylinder (1) and are jointly movable longitudinally within external cylinder (1). Both the first (2) and the second (7) internal cylinder are moved outward from the external cylinder (1) and inward into the external cylinder (1).

Typically, the end connection (20) of the external cylinder (1) of the strut is attached to a fixed aircraft structure and the end connection (21) of the internal cylinders (2, 7) are attached to a movable structure, more specifically to a door.

Extension and retraction of the screw (3) is provided by the drive (4) arrangement, including a drive motor assembly, a gear assembly and a brake (36) of the screw (3) which are mounted at the head end of actuator. Drive (4) assembly includes a housing in which is disposed a motor. The drive (4) motor is coupled to the screw (3) located within internal cylinder (1).

Screw (3) assembly includes an elongated screw (3) and a compatible nut (5) riding thereon and coupled thereto by thread engagement, that run in the external helical groove of screw (3), so that rotation of the screw (3) produces translation of the nut (5) on the screw (3).

In the retracted position, both internal cylinders (2, 7) are disposed inside of the external cylinder (1) with the screw (3) inside of the internal cylinder (1) and the nut (5) being drawn substantially to the head end. In this position, actuator is fully retracted and unlocked.

Actuator is driven from the retracted position to the extended position by operating drive (4) motor assembly in a direction to drive the nut (5) in a direction from head end towards internal cylinder (2) end. Similarly, actuator is driven from the extended position to the retracted position by operating electric drive motor assembly to rotate the screw (3) in an opposite direction to drive the nut (5) in a direction from rod end towards head end.

The external cylinder (1) comprises a locking groove or opening (24) configured to house the at least one locking segment (6) in the extended, locked position. Thereat, locking mechanism is unlocked with the plural segment (6) are in a radially inward position. Two lock segments (6) are shown in the figures and they extend radially outward to engage the openings (24) within the external cylinder (1).

When actuating power is not applied a lock spring (25) maintains the nut (5) and therefore the segment (6) in its locked position.

In the locked position of locking mechanism, the inner end of lock segment (6) is adjacent to a cylindrical surface of a collar (26) located around the nut (5) that is of a given diameter selected to so position the lock segment (6) a predetermined radial distance from a central axis of the screw (3) and nut (5). The collar (26) comprises two cylindrical surfaces of different external diameter, one leaving the segment (6) in a lower position and therefore not engaging the recess (24) in the external cylinder (1) and not locking the strut and a second cylindrical surface having a larger diameter and locating the segment (6) into the mentioned recess (24). In the transition between both cylindrical surfaces a sloped surface exists. The combination of these surfaces provides a cam for moving lock segments (6) radially inward and outward for engaging and disengaging lock segments (6) of lock mechanism. When the nut (5) is moving axially lock segments (6) move and radially out of the openings (24).

Figure 17:
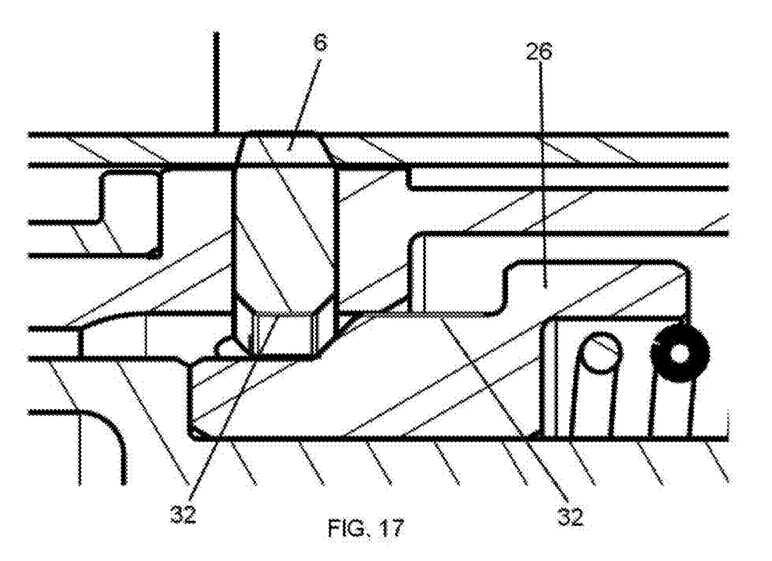
FIG. 17 shows a sectional longitudinal lateral enlarged view of the strut construction of FIG. 2 showing a segment and a nut.

The position of the collar (26) is additionally secured by an angle (32) designed into sliding surfaces between segment (6) and collar (26). This angle (32) is defined in order to guarantee an irreversible system. Any failure in spring (25) or in a retaining ring (33) of the piece retaining the spring (25) do not allow the inadvertent unlocking operation. This angle (32) is used in both: collar (26) and segment (6) and has to be zero or negative as depicted in FIG. 17 considering that negative angles are those measured in the clockwise direction from the positive horizontal axis.

The nut (5) has also two outwardly extending flange segments (27, 29) at each of its opposite ends. One (29) avoids the collar (26) to step out the nut (5) and the other one (27) retain the spring (25) extending between the collar (26) and the flange (27). Lock spring (25) therein serves to bias the nut (5) towards the locked position, urging the collar (26) to move towards the end of the screw (3). Flange (29) avoiding the collar (26) to step out the nut (5), due to the force exerted by the spring (25), is integrated into the nut (5) avoiding an inadvertent unlocking of the system. In order to allow the assembly of the spring (25), the other flange (27) is separated from the nut (5).

In disengaging the lock mechanism out of the locked position, the screw (3) is rotated in the opposite direction to move the nut (5) towards head end. The distal flange (29) of the nut (5) contacts the collar (26) and urges it (26) towards the base, therefore the segment (6) is displaced to the lower surface of the collar (26) and therefore out of the opening (24) of the external cylinder (1).

Figure 3:
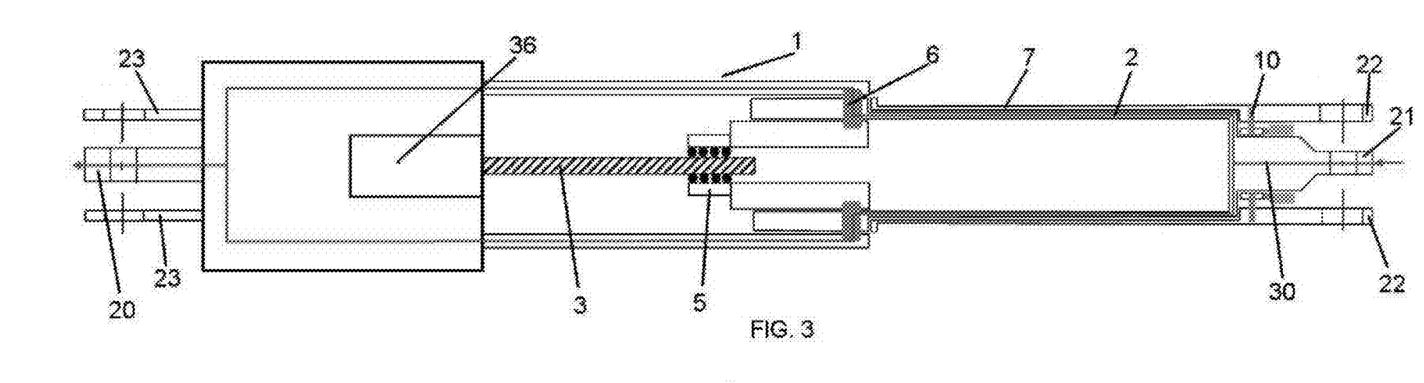
FIG. 3 shows a schematic plan view of the load path of an embodiment of the strut construction in an extended position.

As can be seen in FIG. 3 when the actuator is working properly the load path (30) goes from the end connection (21) configured to be coupled to the door, through the inner cylinder (2) until the segment (6) in which the load is transferred to the external cylinder (1) and then to the end connection (20) configured to be coupled to the aircraft structure. In the extended and locked position, a substantial portion of the internal cylinders (2, 7) extend beyond the end of the external cylinder (1).

The locking mechanism locks the internal cylinders (2, 7) in its extended position relative to the external cylinder (1) so that the structural loads are entirely supported by the external (1) and internal cylinder (2) which are structurally locked together by locking mechanism as can be seen in FIG. 3.

In the extended position, the nut (5) is driven into an over-travel position wherein locking mechanism locks the first internal cylinder (2) to external cylinder (1) with the lock segment (6) of locking mechanism having been driven radially outward to engage into an opening (24) in the wall of the external cylinder (1).

The strut comprises a mechanical element extending between the first inner cylinder (2) and the second inner cylinder (7) configured to avoid the axial and radial relative movement between both cylinders (2, 7). Said mechanical element is a pin (10) located in an opening of the first inner cylinder (2) and in an opening of the second inner cylinder (7). As additionally, the second inner cylinder (7) is in axial contact with the first inner cylinder (2), a second load path is achieved. Said axial contact is performed by two corresponding flanges (34, 35) at the end proximate to the segment (6) orifice of the inner cylinder (2).

Figure 7:
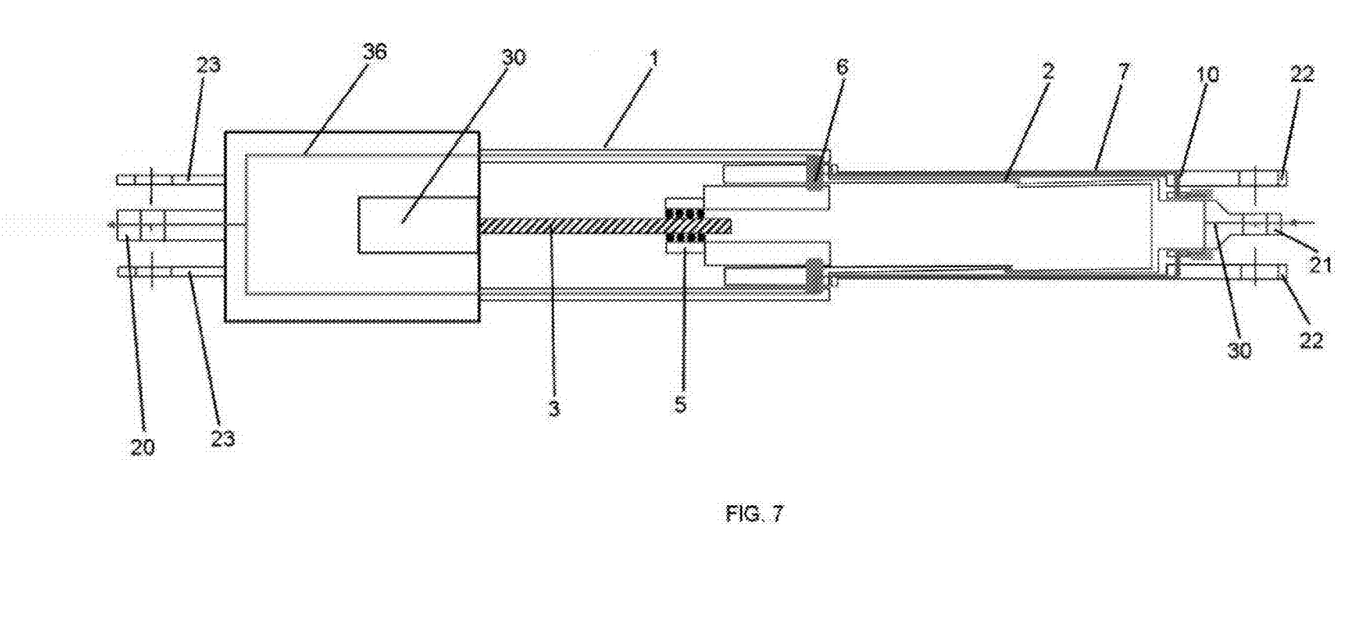
FIG. 7 shows a schematic plan view of the load path of an embodiment of the strut construction in an extended position in case of failure of the inner cylinder.
Figure 8:
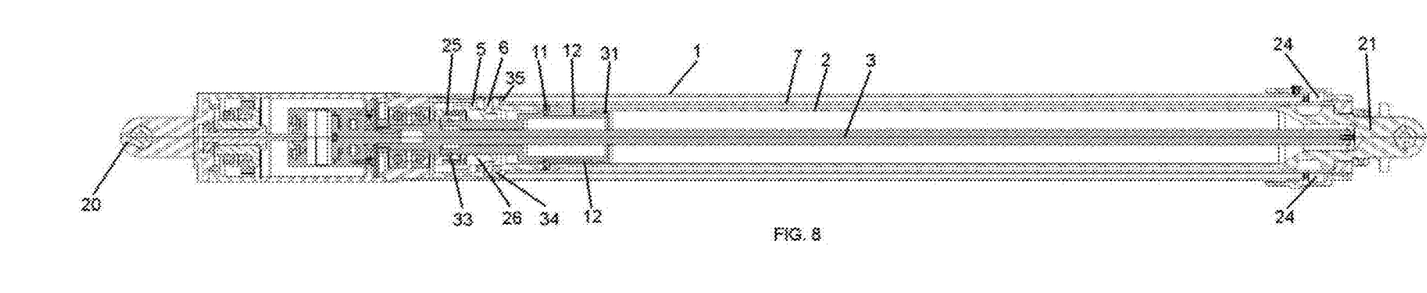
FIG. 8 shows a sectional longitudinal lateral view of the strut construction of FIG. 2 in a retracted position with compression load.
Figure 9:
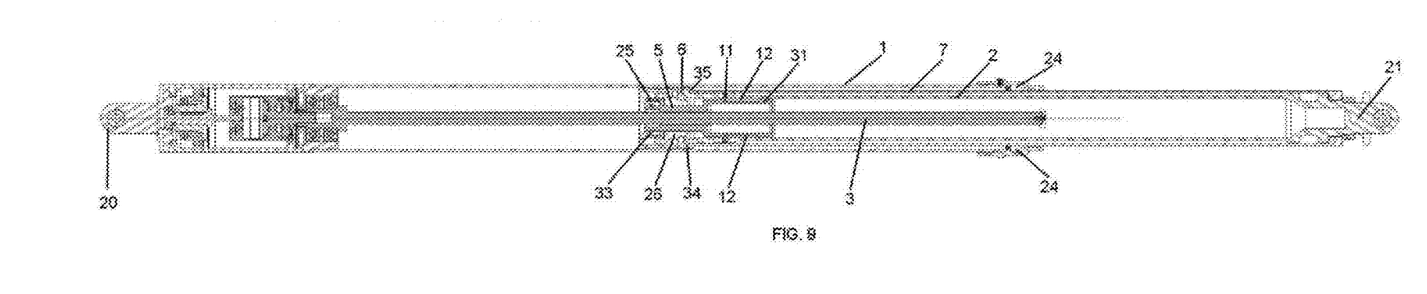
FIG. 9 shows a sectional longitudinal lateral view of the strut construction of FIG. 2 in a travelling position with compression load.
Figure 10:
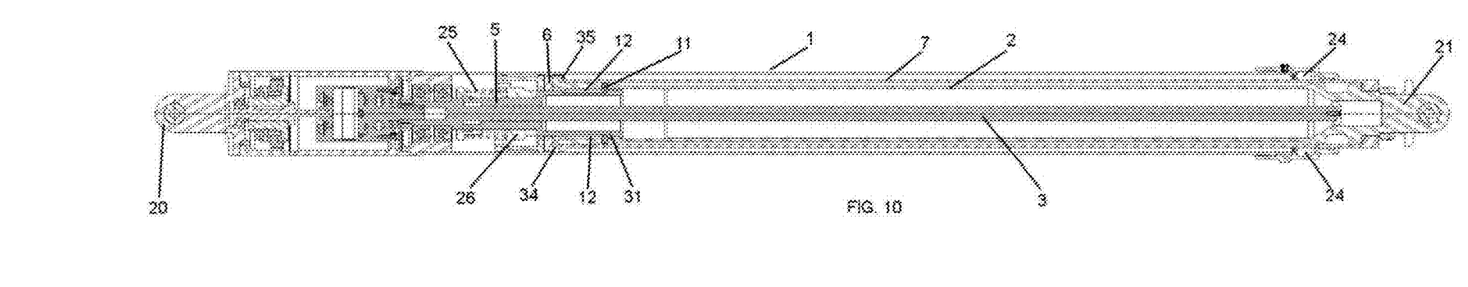
FIG. 10 shows a sectional longitudinal lateral view of the strut construction of FIG. 2 in a retracted position with traction load.
Figure 11:
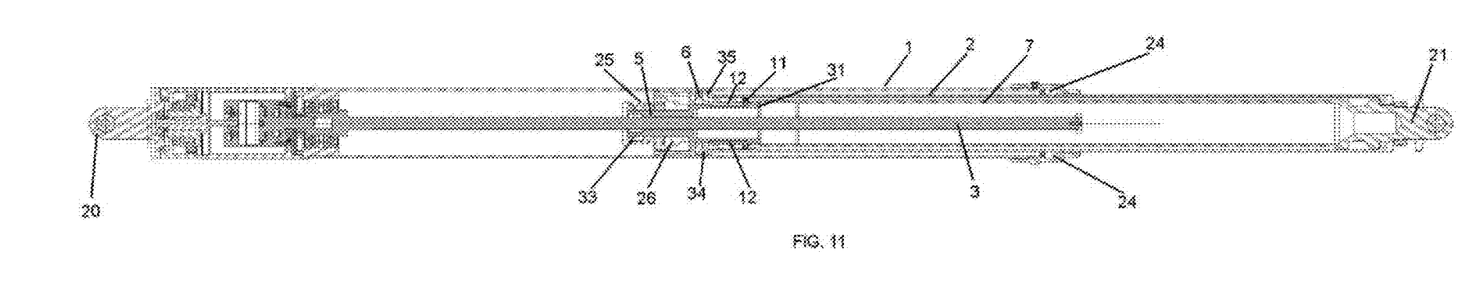
FIG. 11 shows a sectional longitudinal lateral view of the strut construction of FIG. 2 in a travelling position with traction load.
Figure 12:
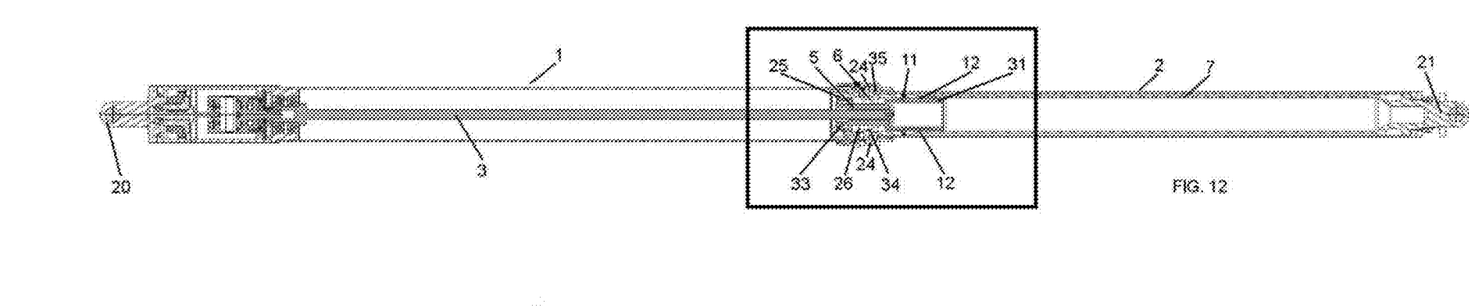
FIG. 12 shows a sectional longitudinal lateral view of the strut construction of FIG. 2 showing its position before locking the segments.

FIG. 7 discloses the actuator working under condition of failure of the inner cylinder (2). In this particular case the load will be transferred from the lug (21) of the inner cylinder (2) to the second inner cylinder (7) by the pin (10) and due to the axial contact between them (2, 7) to the segment (6) and to the external cylinder (1).

Figure 4:
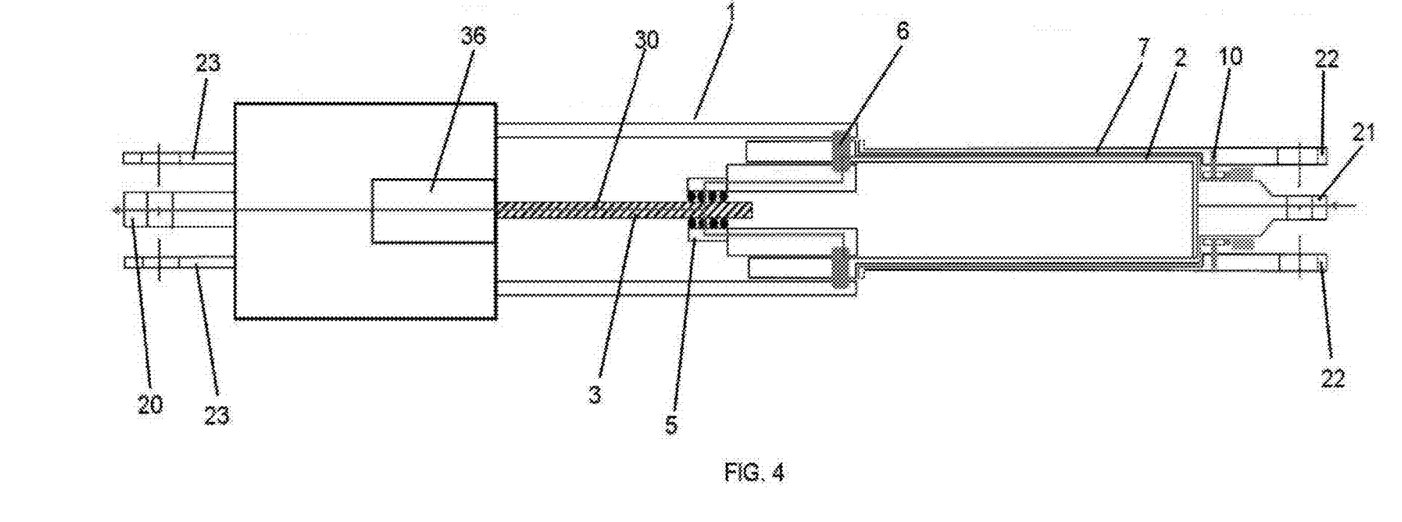
FIG. 4 shows a schematic plan view of the load path of an embodiment of the strut construction in an extended position in case of failure on the segment system.

The electrical telescopic strut construction shown in the figures comprises a mechanical element extending between the inner cylinder (2) and the nut (5) configured to avoid the radial relative movement between both elements (2, 7). The mechanical element is a pin (11) located in an opening of the inner cylinder (2) and in an opening of the nut (5) thus restricting the relative radial movement between the nut (5) and the inner cylinder (2). The pin (11) or pins (11) are located in an extension (31) of the nut (5). The opening of the nut (5) is an axial opening (12) such that there is an axial relative movement between the inner cylinder (2) and the nut (5). Said mechanical element allows a second load path as depicted in FIG. 4 in case of failure of the segment (6) being the load transferred from the internal cylinder (2) to the nut (5) and from there to the screw (3). Therefore, the segments (6) with automatic locking are part of the main road and the screw (3) with brake (36) is part of the second loading path as in case of failure of the segments (6) the assembly screw (3)-brake (36) can stand the applied loads in a second load path.

Figure 13:
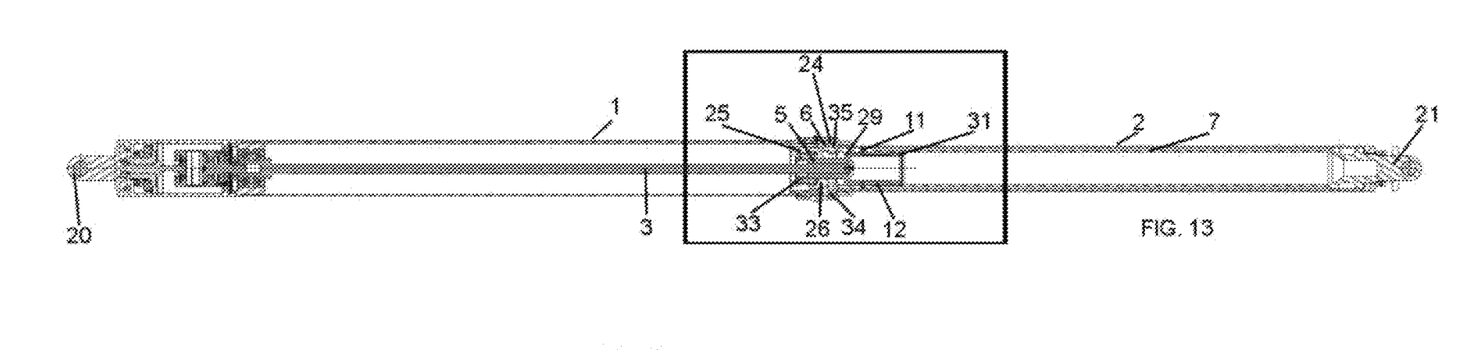
FIG. 13 shows a sectional longitudinal lateral view of the strut construction of FIG. 2 showing its position the segments locked.
Figure 14:
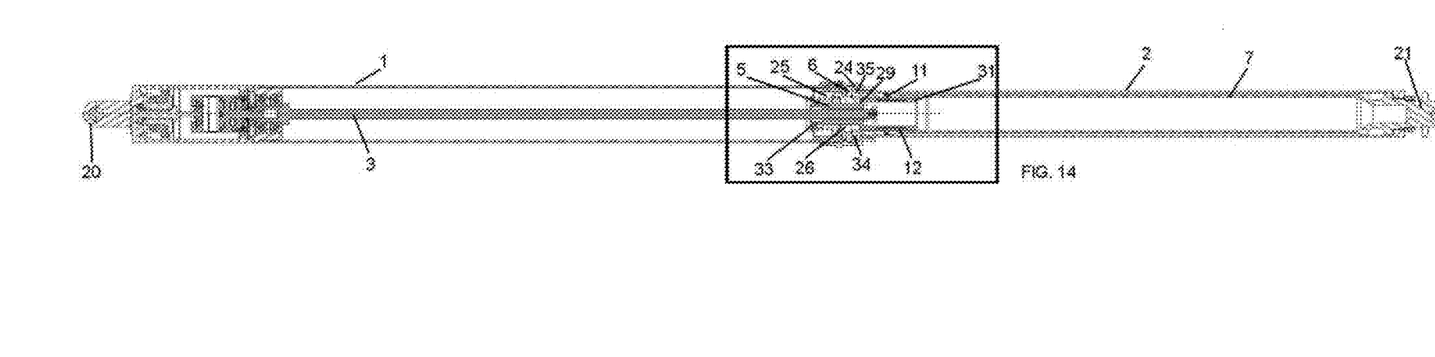
FIG. 14 shows a sectional longitudinal lateral view of the strut construction of FIG. 2 showing the movement of the nut by the motor until it clash with the key.
Figure 15:
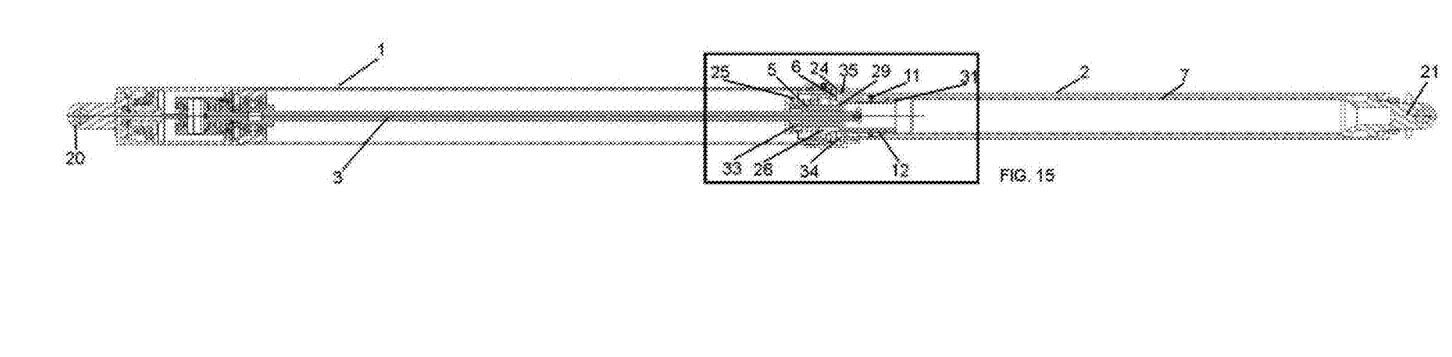
FIG. 15 shows a sectional longitudinal lateral view of the strut construction of FIG. 2 showing its position with segments unlocked.
Figure 16:
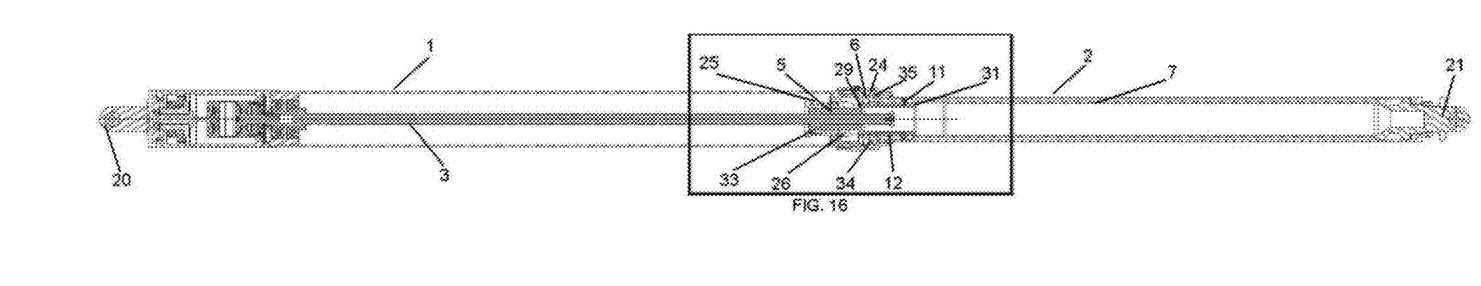
FIG. 16 shows a sectional longitudinal lateral view of the strut construction of FIG. 2 showing the beginning of the retraction after locking the segments.

The nut (5) is connected mechanically to cylinder (2) by means the radial pin (11) located in slidable axial gaps (12). The axial gap (12) allows the strut the absorption of traction and compression loads by displacing the nut (5) with respect to the internal cylinder (2) the length of the axial gap (12). From fully extended or retracted position, the first linear movement of nut (5) created by the rotational movement of screw (3), will absorb this axial gap (12) before any linear movement of cylinders (2, 7). This free movement of the nut (5) with respect to the cylinder (2) allows the unlocking of collar (26) and segments (6) by the displacement of the nut (5) towards the collar (26) until the nut (5) reaches said collar (26) and pushes it to achieve the unlocking of the system as can be seen in FIGS. 13 to 15.

During normal operation to extend and retract the strut, in which the segment (6) is not locked, the load path (30) is conducted through the main mechanical parts as screw (3), pins (11) and cylinder (2). Therefore, the external dynamic loads are not applied through segment (6) during extension and retraction allowing a simpler sizing of segment (6), reducing the shear area required. Segment (6) only supports the static external load in fully extended and locked position.

FIG. 4 shows a case in which there is a failure in the segment (6), in that case, and due to a double path of the actuator, the load is transferred from the inner cylinder (2) to the nut (5) thorough pin (11) and afterwards to the screw (3). The screw (3) is locked by the brake (36) and therefore the load is transferred to the brake (36) and to the end connection (20).

The second inner cylinder (7) comprises a second lug (22) at its free end. Additionally, the second inner cylinder (7) is in axial contact with the first inner cylinder (2), the second lug (22) and the axial contact defining an additional load path as depicted in FIG. 5.

Figure 5:
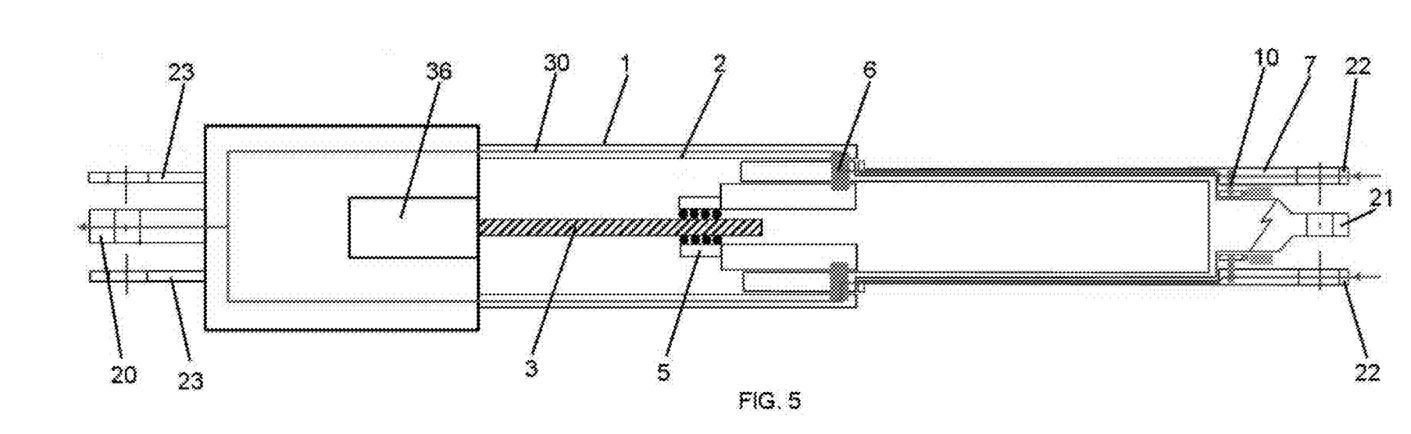
FIG. 5 shows a schematic plan view of the load path of an embodiment of the strut construction in an extended position in case of failure on the lug of the inner cylinder.

FIG. 5 discloses the actuator working under condition of failure of the end connection (21) coupled to the inner cylinder (2). In this particular case the load will be transferred from the end connection (22) coupled with the second internal cylinder (7) to the segment (6) and from there to the external cylinder (1).

The embodiment also shows a second end connection (23) configured to be connected to the aircraft structure and coupled to the armature which is in turn coupled to the external cylinder (1) by an axial contact.

Figure 6:
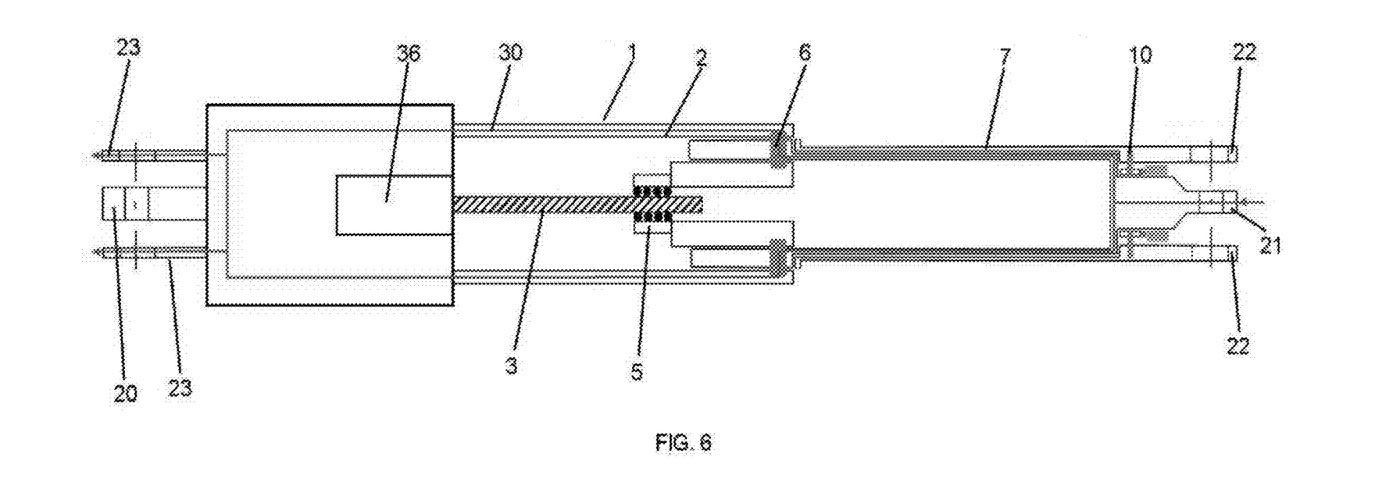
FIG. 6 shows a schematic plan view of the load path of an embodiment of the strut construction in an extended position in case of failure on the lug of the external cylinder.

FIG. 6 discloses the actuator working under condition of failure of the end connection (20) coupled to the external cylinder (1). In this particular case the load will be transferred from the external cylinder (1) to the second end connection (23) of the external cylinder (1).

The invention claimed is:

1. An electrical telescopic strut construction, movable between an extended locked position and a retracted unlocked position, comprising:
   an external cylinder having a connection at an end;
   a first inner cylinder slidable within the external cylinder and having a second connection at an end;
   a screw rotatable disposed within the first inner cylinder;
   a drive configured to rotate the screw;
   a nut coupled to the screw and connected to the first inner cylinder, being movable with respect to the external cylinder responsive to the rotation of the screw;
   at least one segment located in a radial opening of the first inner cylinder and movable radially outward and inward in response to the movement of the nut and configured to engage the external cylinder when moved radially outward and not to engage the external cylinder when moved radially inward,
   the first inner cylinder being lockable to the external cylinder by the segment in an extended position of the strut,
   wherein the strut further comprises a second inner cylinder located external to the first inner cylinder and internal to the external cylinder when the first inner cylinder is retracted into the external cylinder, the second inner cylinder being joined to the first inner cylinder such that both cylinders are displaceable together and the second inner cylinder being in axial contact with the first inner cylinder.

2. The electrical telescopic strut construction according to claim 1, further comprising a mechanical element extending radially between the first inner cylinder and the second inner cylinder configured to avoid the axial and radial relative movement between both cylinders.

3. The electrical telescopic strut construction according to claim 2, wherein the mechanical element is a pin located in an opening of the first inner cylinder and in an opening of the second inner cylinder.

4. The electrical telescopic strut construction according to claim 1, further comprising a mechanical element extending between the first inner cylinder and the nut configured to avoid the radial relative movement between both elements.

5. The electrical telescopic strut construction according to claim 4, wherein the mechanical element is a pin located in an opening of the first inner cylinder and in an opening of the nut.

6. The electrical telescopic strut construction according to claim 5, wherein the opening of the nut is an axial opening such that there is an axial relative movement between the first inner cylinder and the nut.

7. The electrical telescopic strut construction according to claim 1, wherein the second inner cylinder has a pair of connections at its free end coaxial with the connection of the first inner cylinder.

8. The electrical telescopic strut construction according to claim 1, wherein the external cylinder has a pair of connections at its end coaxial with the connection of the external cylinder that are configured to be in axial contact with the external cylinder and to act in case of failure of the first connection.

9. The electrical telescopic strut construction according to claim 1, wherein the nut comprises a collar located around the nut comprising two surfaces of different external diameter, one leaving the segment in a lower position and therefore not engaging the external cylinder and a second cylindrical surface having a larger diameter and locating the segment engaging the external cylinder.

10. The electrical telescopic strut construction according to claim 9, wherein the sliding surfaces between segment and collar comprise both a zero or negative angle.

* * * * *